Dec. 29, 1931.  F. C. ATWOOD  1,838,648
APPARATUS FOR DISTRIBUTING FINELY DIVIDED MATERIAL
Filed Sept. 20, 1929   2 Sheets-Sheet 1
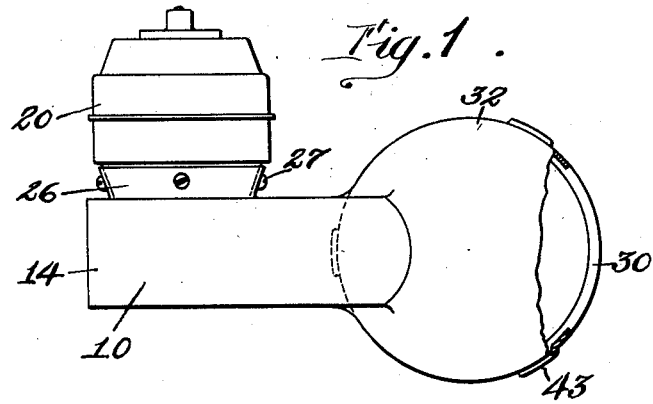
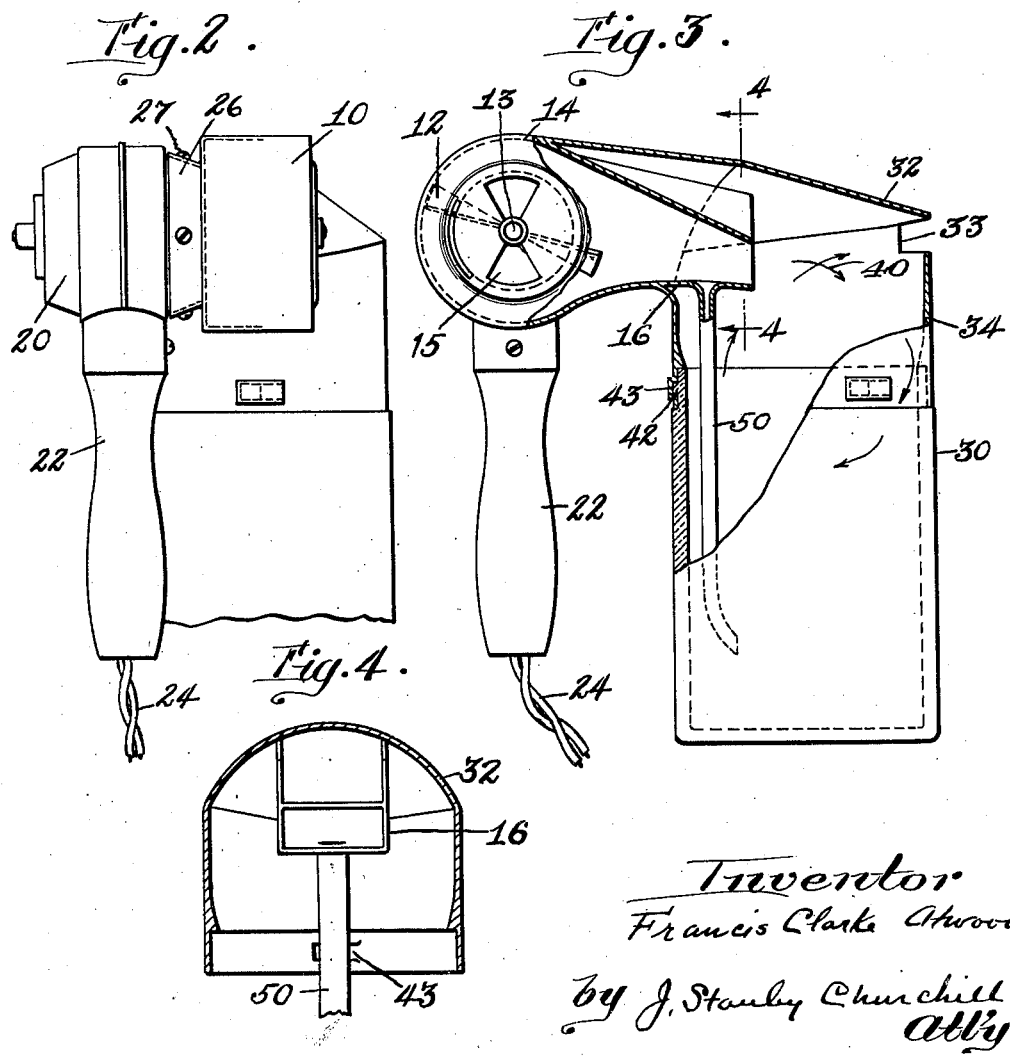

Dec. 29, 1931. F. C. ATWOOD 1,838,648
APPARATUS FOR DISTRIBUTING FINELY DIVIDED MATERIAL
Filed Sept. 20, 1929 2 Sheets-Sheet 2
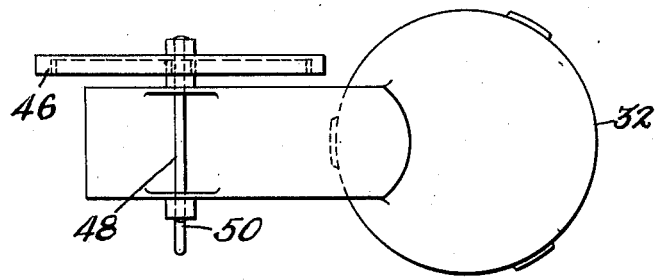
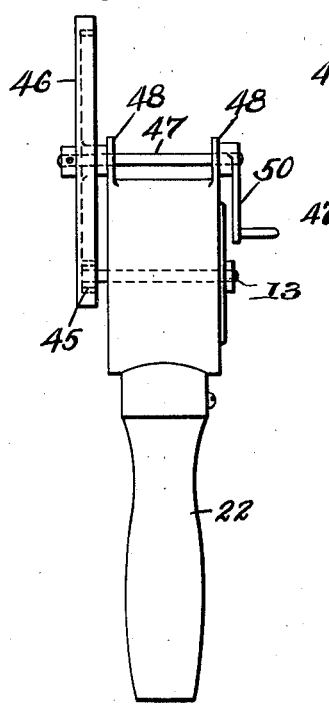
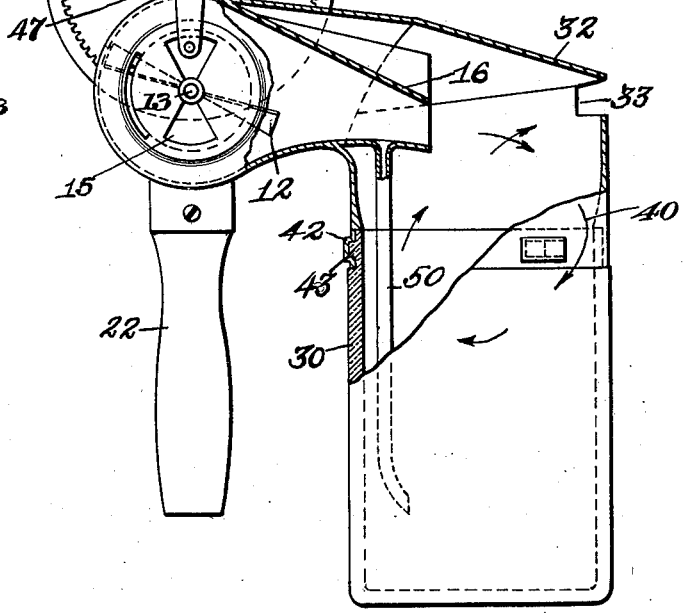

Patented Dec. 29, 1931

1,838,648

UNITED STATES PATENT OFFICE

FRANCIS CLARKE ATWOOD, OF NEWTON, MASSACHUSETTS

APPARATUS FOR DISTRIBUTING FINELY DIVIDED MATERIAL

Application filed September 20, 1929. Serial No. 394,093.

This invention relates to apparatus for distributing finely divided material, and more particularly to an apparatus for spraying dry pigment or color.

One object of the invention is to provide a novel apparatus by which finely divided dry solid material may be distributed in an efficient, artistic, economical and convenient manner.

A further object of the invention is to provide novel apparatus for spraying finely divided pigment or color by means of an air stream in an economical, efficient and artistic manner such as to enable the color to be applied uniformly and designedly over an object.

A still further and more specific object of the invention is to provide a novel color sprayer in which provision is made for generating an air stream and directing it into and out of a color container detachably secured to the air generator providing a portable and unitary apparatus for spraying the color, which may be conveniently used for distributing pigment or color over large surfaces such as walls, ceilings, and the like.

With these objects in view and such others as may hereinafter appear, the invention consists in the apparatus and in the various structures, arrangements and combinations of parts hereinafter described and particularly defined in the claims at the end of this specification.

In the drawings illustrating the preferred embodiment of the invention, Fig. 1 is a plan of the present color or pigment sprayer; Fig. 2 is an end elevation of the same; Fig. 3 is a side view partially in section and partially in elevation; Fig. 4 is a sectional view on the line 4—4 of Fig. 3; and Figs. 5, 6 and 7 are views in plan, end elevation and side elevation with portions in section respectively of a modified form of the present color or pigment sprayer.

Referring now to the drawings, in Figs. 1, 2 and 3, which illustrate the preferred form of color or pigment sprayer, 10 represents a blower of any usual or preferred construction, provided with a fan 12 mounted upon a shaft 13 designed to rotate within a housing 14 to generate an air current. The air enters the blower laterally through suction openings 15 and is discharged through a discharge conduit 16, as illustrated in Fig. 3. The blower shaft 13 is operatively connected with, and preferably comprises the armature shaft of, an electric motor indicated at 20. The motor 20 is preferably mounted on the upper end of a handle 22 through which lead wires 24 for supplying the electric current to the motor are preferably extended. The blower housing 14 is preferably attached, as by a bracket 26 and screws 27, to one side of the motor housing so that the blower forms a unit with the motor 20 and handle 22.

The air stream discharged from the discharge conduit 16 of the blower housing 14 is utilized to pick up and distribute the finely divided material by being directed into a container 30 within which a supply of the finely divided material such as pigment or color is contained, and as herein shown provision is made for effecting this result by the provision of a cap member or housing 32 having a discharge opening 33 which is preferably elongated so that the issuing stream of air carrying the finely divided particles of pigment, color, or the like, may emerge in a general fan shape to be uniformly or designedly distributed over the surface or other object to which the finely divided material is to be applied. The housing 32 is provided with a downwardly extending cylindrical portion 34 against which the air stream is directed downwardly into the container 30, where it picks up the finely divided color or other material and then passes out through the discharge opening 33. The general direction of air movement is indicated by the arrows 40.

Provision is preferably made for detachably connecting the container 30 and the portion 34 of the housing so that the container when thus attached forms a part of the housing and is movable therewith and with the motor and handle as a unit. As herein shown the upper end of the container is provided with a plurality of lugs 42 which are designed to cooperate with locking recesses 43 formed in the lower portion 34 of the housing to detachably secure the container to the housing. When it is desired to remove the container from the housing this may be done by relative rotation of these parts to disengage the lugs from the locking recesses.

In Figs. 5, 6 and 7 I have illustrated a modified form of the present apparatus in which provision is made for manually operating the fan 12 to generate the air current. As illustrated in the drawing, the shaft 13 upon which the fan is mounted is provided with a driving pinion 45 which cooperates with a larger gear 46 mounted upon a counter shaft 47 journalled in suitable bearings 48 in lugs upstanding from the top of the housing. The counter shaft 47 is arranged to be rotated by a handle 50 and the ratio of the gearing between the gear 46 and pinion 45 is such as to enable the fan to be rotated at sufficiently high speed to generate the air current desired. The other details of construction of the modification illustrated in Figs. 5, 6 and 7 may and preferably will comprise those illustrated in the motor driven apparatus illustrated in Figs. 1 to 4.

In order that the finely divided material may be picked up by the air stream and directed down into the container 30 in a most efficient manner, the air conduit 16 may be directed into the container at the angle found most suitable for accomplishing this result, depending upon the general character of the material to be sprayed. Provision is preferably made in both forms of apparatus illustrated in Figs. 1 to 4 and Figs. 5 to 7 for agitating the bulk supply of finely divided material within the container 30 when those finely divided materials which tend to pack down are to be sprayed. Any suitable form of agitating mechanism may be employed but I prefer to provide an auxiliary conduit 50 for by-passing a portion of the air stream down into the bulk supply of finely divided material to thereby agitate the mass by means of the auxiliary air stream. In addition, the auxiliary conduit permits the operation of the apparatus with a relatively light main air stream issuing from the conduit 16, because of the fact that the bulk of the finely divided material is maintained in a light condition most suitable for suspension in the main air stream.

From the description thus far it will be observed that the described apparatus comprises a portable unit which may be used with advantage by a painter in applying color to a wall, ceiling or other surface, and that the application of the color or other finely divided material may be accomplished in a rapid, convenient and most efficient manner. The manner in which the finely divided material is picked up by the air stream and then discharged from the housing through the discharge opening 33 insures the application of the finely divided material such as color in either a uniform manner or in any design, as all of the particles of the finely divided material are carried in the air stream in the form of a suspension, thus precluding the production of unsightly spotted effects upon the surface to which the color or other material is applied. The detachable container may be readily filled with fresh color or the color changed in a convenient and efficient manner. In practice it may be preferred to ship the color in containers designed for use in connection with the standard size of housing, thus enabling the single blower unit to be used with a plurality of containers, each containing a different color.

While the preferred embodiments of the invention have been herein illustrated and described, it will be understood that the invention may be embodied in other forms within the scope of the following claims.

Having thus described the invention what is claimed is:—

1. Apparatus for distributing finely divided material comprising a receptacle open at its top, a cap member detachably secured to and forming a closure for the top of the receptacle and provided with an elongated discharge opening, a fan carried by the cap member and having an air outlet conduit within the cap member arranged with respect to the discharge opening to effect the direction of the air stream against a wall of the cap member and thence down into the container prior to its discharge in a fan shaped stream through the elongated opening in the cap member.

2. Apparatus for distributing finely divided material comprising a receptacle open at its top, a cap member detachably secured to the receptacle to form a closure for the top thereof and provided with an elongated discharge opening, a fan, and a motor for driving the fan, both mounted upon the cap member to be movable as a unit therewith, a discharge conduit for the main air stream arranged with respect to the discharge opening in the cap member to cause the air stream to be directed down into the container and thence out through the discharge opening in the cap member in a fan shaped stream.

3. Apparatus for distributing finely divided material comprising a container open at its top, a cap member detachably secured to the container and forming a closure for the top thereof, and means for generating an air stream mounted upon said cap member, a discharge conduit for the air stream arranged to effect movement of the air stream down into the container and thence out through the elongated discharge opening in a fan shaped stream.

4. Apparatus for distributing finely divided material comprising a container open at its top, a cap member detachably secured to the container and forming a closure for the top thereof and provided with an elongated discharge opening, means for generating an air stream mounted upon the cap member, a discharge conduit for the main air stream arranged to effect direction of the air down into the container prior to its passage out through the discharge opening in the cap member in a fan shape, and an auxiliary conduit for conducting a small portion of the air from the main air stream down into the lower portion of the container for agitating the mass of material therein.

In testimony whereof I have signed my name to this specification.

FRANCIS CLARKE ATWOOD.